United States Patent
Kanai et al.

(10) Patent No.: US 7,072,983 B1
(45) Date of Patent: Jul. 4, 2006

(54) SCHEME FOR SYSTEMICALLY REGISTERING META-DATA WITH RESPECT TO VARIOUS TYPES OF DATA

(75) Inventors: Tatsunori Kanai, Kanagawa (JP); Toshiki Kizu, Kanagawa (JP); Seiji Maeda, Tokyo (JP); Takeshi Yokokawa, Tokyo (JP); Hiroshi Yao, Kanagawa (JP); Osamu Torii, Kanagawa (JP); Hirokuni Yano, Tokyo (JP); Hisako Tanaka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/532,535

(22) Filed: Mar. 22, 2000

(30) Foreign Application Priority Data

Mar. 23, 1999 (JP) ........................ P 11-077479

(51) Int. Cl.
  *G06F 15/16* (2006.01)

(52) U.S. Cl. ................ 709/246; 709/217; 709/223; 707/102

(58) Field of Classification Search .............. 709/217, 709/223, 246, 200; 707/102; 73/3, 3.3, 3.6
  See application file for complete search history.

(56) References Cited

U.S. PATENT DOCUMENTS

| | | |
|---|---|---|
| 5,557,780 A | 9/1996 | Edwards et al. |
| 5,627,997 A | 5/1997 | Pearson et al. |
| 5,629,846 A | 5/1997 | Crapo |
| 5,715,397 A | 2/1998 | Ogawa et al. |
| 5,721,912 A | 2/1998 | Stepczyk et al. |

(Continued)

FOREIGN PATENT DOCUMENTS

| | | |
|---|---|---|
| AU | 53031/98 | 8/1998 |
| WO | WO 98/03928 | 1/1998 |

OTHER PUBLICATIONS

Noah, W. W., "The Integration of the World Wide Web and Intranet Data Resources", 31st Annual Hawaii Intl. Conf. System Sciences, vol. 4, Jan. 6–9, 1998, pp. 496–502.*

Lee, E. K., et al., "An Enterprise Intelligence System Integrating WWW and Intranet Resource", Proc. Ninth Intl. Wkshp on Research Issues on Data Engineering: Information Technology of Virtual Enterprises, Mar. 23–24, 1999, pp. 28–35.*

Whitehead, Jr., E. J., "World Wide Web Distributed Authoring and Versioning (WEBDAV): An Introduction", ACM StandardView, Mar. 1997, pp. 1–10.*

An enterprise intelligence system integrating WWW and intranet resource Lee, E.K.; Noah, W.; Research Issues on Data Engineering: Information Technology for Virtual Enterprises, 1999. RIDE–VE '99. Proc., Ninth Intl. Wkshp on , Mar. 23–24 1999, pp. 28–35.*

(Continued)

*Primary Examiner*—Frantz B. Jean
(74) *Attorney, Agent, or Firm*—Oblon, Spivak, McClelland, Maier & Neustadt, P.C.

(57) ABSTRACT

A scheme for systematically registering meta-data with respect to various types of individual data so as to enable sophisticated retrieval or application program construction assistance utilizing the meta-data in a data server is disclosed. A data-type of registering data to be registered into a data server that registers and manages data and meta-data for data, and one procedure corresponding to the detected data type is selected from a plurality of procedures provided in correspondence to respective data types and stored in advance, each procedure having a program code for gene rating the meta-data for data according to a corresponding data type. Then, the meta-data for the registering data are generated by executing the program code of the selected procedure, and the generated meta-data are registered in relation to the registering data.

20 Claims, 11 Drawing Sheets

U.S. PATENT DOCUMENTS

| | | | | |
|---|---|---|---|---|
| 5,793,966 A | * | 8/1998 | Amstein et al. | 709/203 |
| 5,835,712 A | | 11/1998 | DuFresne | |
| 5,864,679 A | * | 1/1999 | Kanai et al. | 709/238 |
| 5,901,245 A | * | 5/1999 | Warnick et al. | 382/190 |
| 5,970,490 A | * | 10/1999 | Morgenstern | 707/10 |
| 6,101,215 A | * | 8/2000 | Takeda et al. | 375/221 |
| 6,115,717 A | * | 9/2000 | Mehrotra et al. | 707/102 |
| 6,304,948 B1 | * | 10/2001 | Motoyama et al. | 711/162 |
| 6,377,953 B1 | * | 4/2002 | Gawlick et al. | 707/102 |
| 6,463,444 B1 | * | 10/2002 | Jain et al. | 707/104.1 |
| 6,466,970 B1 | * | 10/2002 | Lee et al. | 709/217 |
| 6,686,970 B1 | * | 2/2004 | Windle | 348/584 |

OTHER PUBLICATIONS

Dominic Giampaolo, "Practical File System Design with the BE File System", 1999, pp. 65–97.

Y.Y. Goland, et al., "HTTP Extentions for Distributed Authoring–WEBDAV", Feb. 1999, pp. 1–71.

"Recording–Helical–Scan Digital Video Cassette Recording System Using 6.35 MM Magnetic Tape for Consumer Use (525–60, 625–50, 1125–60, 1250–50 Systems)—Part 4: Pack Header Table and Contents", International Electrotechnical Commission, 1998, pp. 1–7, 116–147.

Saveen Reddy, et al., "DAV Searching and Locating", DAV Searching and Locating Protocol, Jun. 3, 1999, pp. 1–26.

"Digital Still Camera Image File Format Standard", Japan Electronic Industry Development Association Standard, Jun. 1998, pp. 17–69.

T. Berners–Lee, et al., "Hypertext Transfer Protocol–HTTP/1.0", Network Working Group, May 1996, pp. 1–60.

R. Fielding, et al., "Hypertext Transfer Protocol–HTTP/1.1", Network Working Group, Jan. 1997, pp. 1–162.

* cited by examiner

FIG. 7

| MIME TYPE | EXTENSION | META-DATA GENERATION PROCEDURE |
|---|---|---|
| application/msword | doc | metadoc |
| application/pdf | pdf | metapdf |
| image/jpeg | jpeg,jpg | metajpeg |
| image/tiff | tiff,tif | metatiff |
| video/x-msvideo | avi | metaavi |
| video/quicktime | qt,mov | metaqt |
| text/xml | xml | metaxml |
| ⋮ | ⋮ | ⋮ |

FIG. 9

| date | 1998-07-12 |
|---|---|
| author | Y.Suzuki |
| program | photoshop 4.0 |

FIG. 10

```
<?xml version="1.0">
<!DOCTYPE book SYSTEM "book.dtd">
<book>
  <title>Practical File System Design with the Be File System</title>
  <author>Domanic Giampaolo</author>
  <publisher>Morgan Kaufmann Publishers, Inc.</publisher>
  <isbn>1558604979</isbn>
  <date>November 1998</date>
  <price unit="USD">34.95</price>
  237
  <dimension unit="inch">0.62 x 8.97 x 7.04</dimension>
  <contents>
    <chapter num="1">Introduction to the BeOS and BFS</chapter>
    <chapter num="2">What Is a File System</chapter>
    <chapter num="3">Other File System</chapter>
    <chapter num="4">The Data Structures of BFS</chapter>
  - <chapter num="5">Attributes, Indexing, and Queries</chapter>
    <chapter num="6">Allocation Policies</chapter>
    <chapter num="7">Journaling</chapter>
    <chapter num="8">The Disk Block Cache</chapter>
    <chapter num="9">File Systenm Performance</chapter>
    <chapter num="10">The Vnode Layer</chapter>
    <chapter num="11">User-Level API</chapter>
    <chapter num="12">Testing</chapter>
    <chapter num="Appendix">A File System Construction Kit</chapter>
    <chapter>Bibliography</chapter>
    <chapter>Index</chapter>
  </contents>
  <keywords>BeOS. File System, Journaling, Index</keywords>
</book>
```

FIG. 11

| DTD NAME | ELEMENT NAME | META-DATA NAME |
|---|---|---|
| book.dtd | title | title |
| book.dtd | author | author |
| book.dtd | keywords | keyword |
| photo.dtd | title | title |
| photo.dtd | GPS info | location |
| photo.dtd | date | date |
| photo.dtd | creator | author |
| ⋮ | ⋮ | ⋮ |

FIG. 12

| title | Practical File System Design with the Be File System |
|---|---|
| author | Domanic Giampaolo |
| keyword | BeOS, File System, Journaling, Index |

SCHEME FOR SYSTEMICALLY REGISTERING META-DATA WITH RESPECT TO VARIOUS TYPES OF DATA

BACKGROUND OF THE INVENTION

1. Field of the Invention

The present invention relates to a meta-data registration scheme to be utilized in a data server device. In the following description, a word "meta-data" stands for any data on a registered data (or data to be registered) which can be utilized in handling or managing the registered data.

2. Description of the Invention

In a system for providing information to users through information terminals and information processing by computers, a data server device has been used as a device for registering and storing data, from which a specified data can be retrieved or data satisfying a desired condition can be searched and retrieved. The data server device can be implemented in a form of a file system or a database management system which is a part of an operating system of a computer, or a Web server, file server or database server with respect to which data can be entered or retrieved through a network.

A Web server which is one variant of the data server device manages various data on a name space having treelike hierarchical structure as shown in FIG. 1. In this example, "/proj/doc/fig/image1.gif" and "/proj/doc/fig/image2.gif" are image data in GIF format, "/proj/doc/spec.doc" is a document produced by a word processor (MS-WORD), "/proj/src/program.c" is a source code of a program written in the C language, and "/sample/index.html" is a document file written in HTML. Nodes that classify data such as nodes specified by "/proj" or "/proj/doc/fig" are generally referred to as directories. In each directory, arbitrary many data or directories can be included. A directory "/" that is at a top level in FIG. 1 will be referred to as a root directory.

Data managed by the Web server can be accessed by the HTTP protocol through a network. The HTTP protocol is disclosed in "Hypertext Transfer Protocol—HTTP/1.0" (RFC 1945) and "Hypertext.Transfer Protocol—HTTP/1.1" (RFC 2068). When some client wishes to obtain data of "/proj/doc/fig/image1.gif", for instance, this client sends a GET request having a header in a format of "GET /proj/doc/fig/image1.gif HTTP/1.1" to this Web server. Upon receiving this request, the Web server returns the requested data.

In order to register data on the Web server, a PUT request of the same HTTP protocol is used. When some client wishes to register a new image data in the GIF format under the name of "/proj/doc/fig/image3.gif". for instance, this client sends a PUT request having a header in a format of "PUT /proj/doc/fig/image3.gif HTTP/1.1" to this Web server, while containing the image data to be registered in a body of this PUT request. Upon receiving this request, the Web server stores the received image data under the specified name.

In the HTTP protocol, a type of data to be exchanged by GET or PUT in terms of a MIME type. For instance, a type of data to be transferred is specified by a header in a form of "Content-type: image/gif".

A UNIX file system which is another example of the data server device manages various data (called files in the case of the file system) on a name space having a treelike hierarchical structure as shown in FIG. 2. In the example of FIG. 2, "proc.c" and "sys.h" are referred to as files, while "src" and "include" are referred to as directories. At a time of accessing a file in the file system, a file name of a file to be accessed is specified by a file name having a hierarchical structure such as "/src/kernel/proc.c".

It is well known that data managed by the data server device can be handled more conveniently by attaching meta-data to each data. There are various examples of the meta-data including creation date and location, a creator, an access control information, an update log, a data source (information indicating where this data comes from), a channel, an EPG (electronic program guide), a thumb nail in the case of image data, an icon to be displayed by GUI, a position to be displayed on a display, an application that created that data, an application for browsing that data, a MIME type of data, a size of data, and keywords to be used in the retrieval.

Meta-data is also referred to as property or attribute in some contexts.

When data are managed by attaching meta-data, it becomes possible not only access data by specifying its name, but also retrieve the data by specifying a value of its meta-data, or manage information necessary for applications in relation to the data.

A scheme for registering meta-data in the Web server is disclosed as a part of the specification called WebDAV in "HTTP Extensions for Distributed Authoring—WEBDAV" (Internet Draft: draft-ietf-webdav-protocol-10). In the WebDAV, it is possible to attach meta-data called property to data managed by the Web server.

The Web server compatible with WebDAV manages data as shown in FIG. 3. It is basically the same as the Web server shown in FIG. 1, but unlike the usual Web server, it manages data and meta-data (property) in relation to each other. The property is maintained by a pair of a name and a value. In the example of FIG. 3, data specified by "/doc/fig/image1.gif" has three properties of "author", "date" and "ccess". The "author" property has a creator of the data as its value, which is "T. Sato" in this case. The "date" property indicates the date on which the data was created and the "access" property indicates an access right information in this example.

In the WebDAV, a directly is referred to as a collection. In FIG. 3, intermediate nodes of the tree specified by "/" or "/doc/fig" are collections. In the specification of the WebDAV, it is possible to attache a meta-data to the collection as well. In the following description, this collection will also be referred to as a directory.

In the WebDAV, new request methods are added by extending the HTTP protocol in order to access the property. More specifically, a PROPFIND method is provided in order to extract a value of the property, and a PROPPATCH method is provided in order to set up or delete a value of the property. By issuing a request using these methods, it becomes possible to access the property. The bodies of PROPFIND or PROPPATCH requests and replies are required to be described using XML.

A scheme for retrieving data managed by attaching the property according to the specification of the WebDAV is called a DASL, which is disclosed in "DAV Searching & Locating" (Internet Draft: draft-reddy-dasl-protocol-04.txt). The DASL adds a SEARCH method for the retrieval by expanding the HTTP protocol, such that when a SEARCH request containing a retrieval condition described by XML in its body is sent, a corresponding retrieval result written in the same XML will be returned. In the retrieval condition, a value of a property of a specific name can be specified with respect to a certain property or a combination of a plurality of properties.

An exemplary case of registering meta-data in the UNIX type file system includes a Be file system disclosed in Dominic Giampaolo: "Practical File System Design with the Be File System", Morgan Kaufmann Publishers, Inc., ISBN 1-55860-497-9. The Be file system manages files in the name space having a tree-like hierarchical structure similar to the UNIX, where meta-data called attribute can be attached to each file. The attribute is given by a pair of a name and a value, where the name is given by a character string, and the value is given by data such as a character string, integer, real number, binary number, etc.

Similarly as in the DASL, files can be retrieved using an attribute value or a combination of attribute values in the Be file system.

As described, in the data server device capable of managing meta-data, it is possible to manage various information as meta-data in relation to the data. In addition, it becomes possible to realize sophisticated accesses based on the retrieval using various information as keys, rather than a simple access using a name of data or file. Furthermore, the construction of an application program can be also made easier as the application manages information related to data as meta-data in relation to the data.

The data server device for managing meta-data in relation to data has various advantageous features as described above, but the full advantages of these features cannot be taken unless meta-data are actually attached to individual data. However, attaching meta-data to individual data requires enormously tedious tasks.

There are meta-data such as creation date and size of a file which can be attached automatically at a time of registering data. However, such meta-data are limited only to the generic meta-data that do not depend on data type and the like. If tasks to attach meta-data can be made automatic somehow, even to some extent, for the other kinds of meta-data, it is possible to expect that the user will be relieved from tedious tasks.

Also, at a time of attaching meta-data, if different names are used for the meta-data having the same meaning depending on persons who attach them or times at which they are attached, or if the meta-data are attached to the data of the same type under arbitrarily different names by different applications, it becomes impossible to realize the effective retrieval later on. Consequently, there has been a demand for a way to attach meta-data systematically to some extent.

SUMMARY OF THE INVENTION

It is therefore an object of the present invention to provide a scheme for systematically registering meta-data with respect to various types of individual data so as to enable sophisticated retrieval or application program construction assistance utilizing the meta-data in the data server device.

According to one aspect of the present invention there is provided a meta-data registration method, comprising the steps of: detecting a data type of registering data to be registered into a data server that registers and manages data and meta-data for data; selecting one procedure corresponding to the data type detected by the detecting step, from a plurality of procedures provided in correspondence to respective data types and stored in advance, each procedure having a program code for generating the meta-data for data according to a corresponding data type; generating the meta-data for the registering data by executing the program code of said one procedure selected by the selecting step; and registering the meta-data generated by the generating step in relation to the registering data into the data server.

According to another aspect of the present invention there is provided a meta-data registration device, comprising: a detection unit configured to detect a data type of registering data to be registered into a data server that registers and manages data and meta-data for data; a selection unit configured to select one procedure corresponding to the data type detected by the detection unit, from a plurality of procedures provided in correspondence to respective data types and stored in advance, each procedure having a program code for generating the meta-data for data according to a corresponding data type; and an output unit configured to output the meta-data for the registering data generated by executing the program code of said one procedure selected by the selection unit, to the data server.

According to another aspect of the present invention there is provided a data server device, comprising: a request processing unit configured to receive and process a registration request for registering data to be registered into the data server device; a management unit configured to register the registering data according to the registration request and manage data and meta-data for data; a detection unit configured to detect a data type of the registering data; a selection unit configured to select one procedure corresponding to the data type detected by the detection unit, from a plurality of procedures provided in correspondence to respective data types and stored in advance, each procedure having a program code for generating the meta-data for data according to a corresponding data type; a generation unit configured to generate the meta-data for the registering data by executing the program code of said one procedure selected by the selection unit; and a registration unit configured to register the meta-data generated by the generation unit into the management unit.

According to another aspect of the present invention there is provided a computer usable medium having computer readable program codes embodied therein for causing a computer to function as a meta-data registration device, the computer readable program codes include: a first computer readable program code for causing said computer to detect a data type of registering data to be registered into a data server that registers and manages data and meta-data for data; a second computer readable program code for causing said computer to select one procedure corresponding to the data type detected by the second computer readable program code, from a plurality of procedures provided in correspondence to respective data types and stored in advance, each procedure having a program code for generating the meta-data for data according to a corresponding data type; and a third computer readable program code for causing said computer to output the meta-data for the registering data generated by executing the program code of said one procedure selected by the second computer readable program code, to the data server.

According to another aspect of the present invention there is provided a computer usable medium having computer readable program codes embodied therein for causing a computer to function as a data server device, the computer readable program codes include: a first computer readable program code for causing said computer to receive and process a registration request for registering data to be registered into the data server device; a second computer readable program code for causing said computer to register the registering data according to the registration request and manage data and meta-data for data; a third computer readable program code for causing said computer to detect a data type of the registering data; a fourth computer readable program code for causing said computer to select one procedure corresponding to the data type detected by the third computer readable program code, from a plurality of procedures provided in correspondence to respective data types and stored in advance, each procedure having a program code for generating the meta-data for data according to a corresponding, data type; a fifth computer readable program code for causing said computer to generate the meta-data for the registering data by executing the program code of said one procedure selected by the fourth computer readable program code; and a sixth computer readable program code for causing said computer to register the meta-data generated by the fifth computer readable program code into the second computer readable program code.

Other features and advantages of the present invention will become apparent from the following description taken in conjunction with the accompanying drawings.

BRIEF DESCRIPTION OF THE DRAWINGS

FIG. 7 is a diagram showing an exemplary meta-data generation procedure table used in the meta-data registration device of FIG. 5.

FIG. 9 is a diagram showing an exemplary meta-data generated by the meta-data registration processing of FIG. 8.

FIG. 10 is a diagram showing an exemplary XML document that can be handled by the meta-data registration device of FIG. 5.

FIG. 11 is a diagram showing an exemplary XML meta-data correspondence table that can be used in the meta-data registration device of FIG. 5.

FIG. 12 is a diagram showing an exemplary meta-data generated from a XML document data by the meta-data registration device of FIG. 5.

DETAILED DESCRIPTION OF THE PREFERRED EMBODIMENTS

Referring now to FIG. 4 to FIG. 14, the preferred embodiments of a meta-data registration scheme according to the present invention will be described in detail.

In short, in the meta-data registration scheme of the present invention, a plurality of meta-data generation procedures (programs) for respective data types are stored in a computer (a meta-data registration device or a data server device) in advance, a meta-data registration procedure corresponding to a type of data to be registered into the data server device is selected from these stored meta-data generation procedures, and a meta-data is automatically generated using the selected meta-data generation procedure and registered in relation to the registering data.

Figure 1:
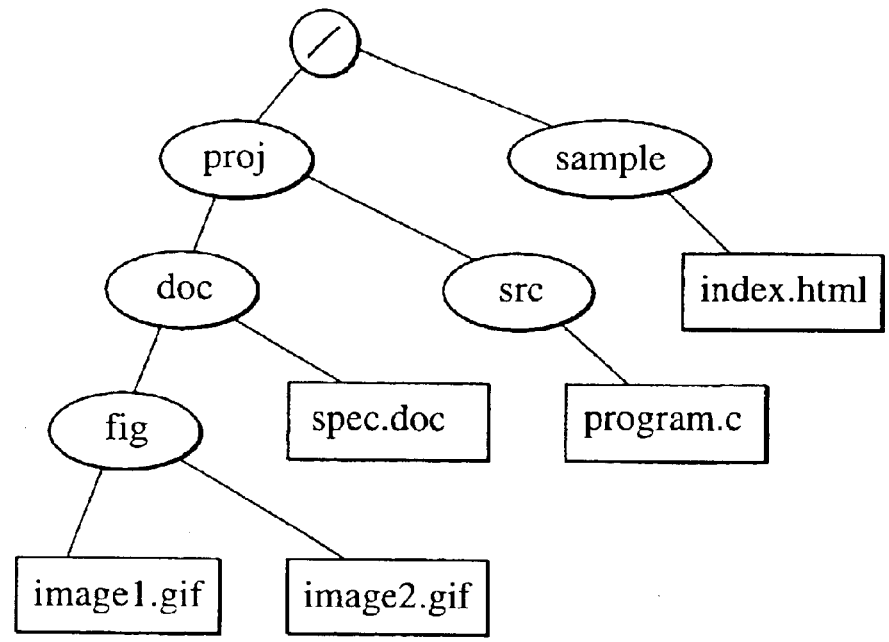
FIG. 1 is a diagram for explaining a conventional data management method used in a Web server.
Figure 2:
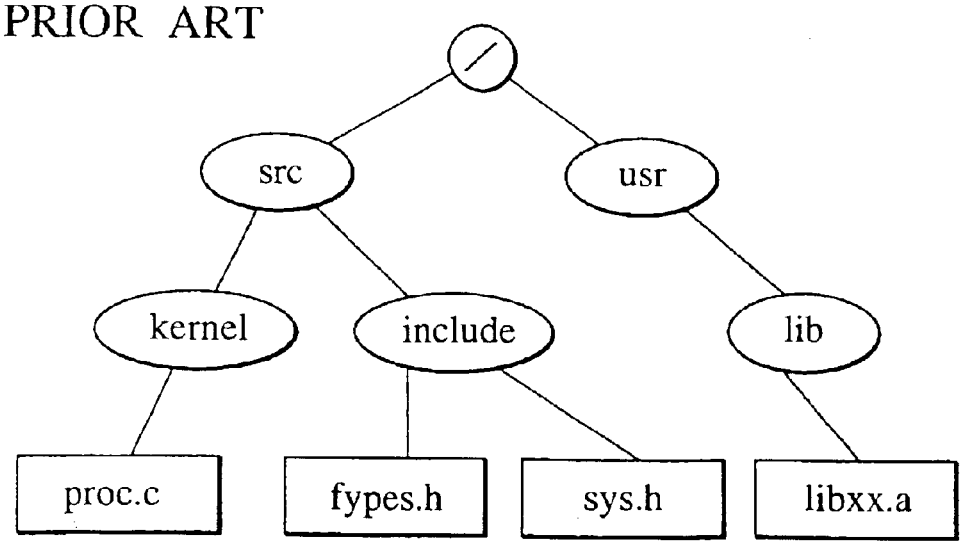
FIG. 2 is a diagram for explaining a conventional data management method used in a UNIX file system.
Figure 3:
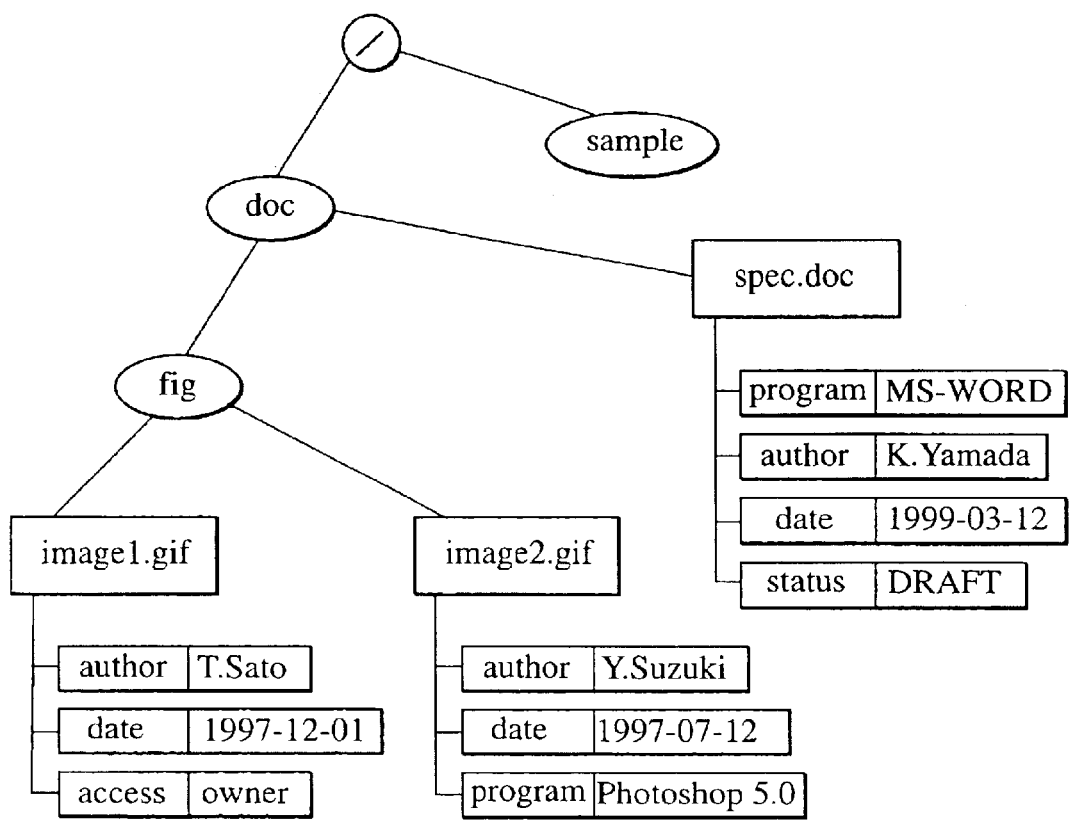
FIG. 3 is a diagram for explaining a conventional data management method used according to WebDAV.
Figure 4:
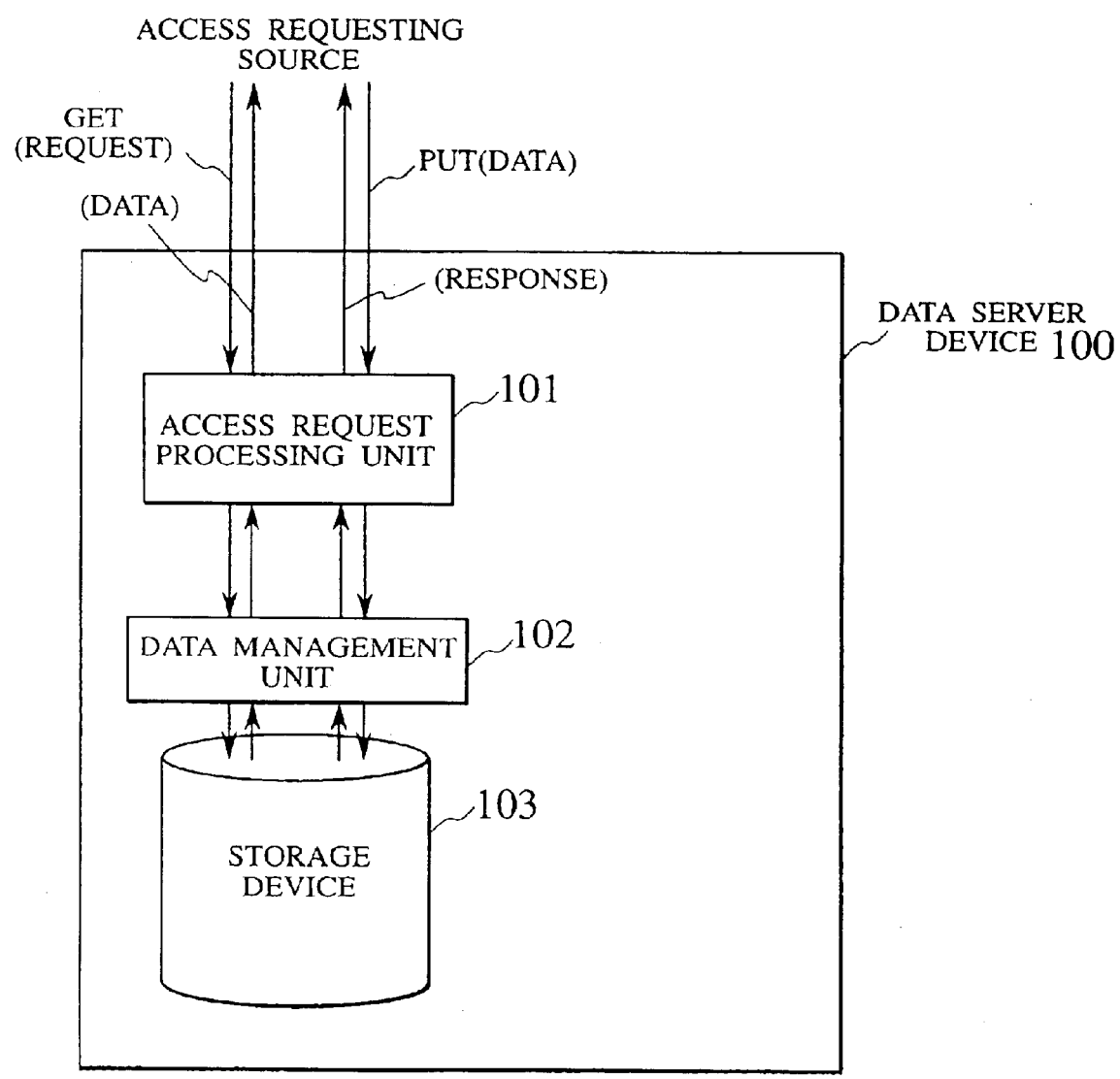
FIG. 4 is a schematic block diagram showing a general configuration of a data server device.

FIG. 4 shows a general configuration of a data server device 100, which comprises a storage device 103 which is a device for actually storing data such as a magnetic disk device, a data management unit 102 for managing which data is stored in which region of the storage device 103, and an access request processing unit 101 which receives an access request from an access requesting source which is either an application program or a user (including a terminal device, a client, etc., on a network), commands reading/writing of data necessary for the requested access to the data management unit 102, and returns a request processing result to the access requesting source. Here, the request processing result is given by either a status information (response) indicating whether the data writing has succeeded or not in the case of a data writing request (PUT containing data, for example), or the read out data or a status information indicating that the data reading has failed in the case of a data reading request (GET indicating request, for example).

Figure 5:
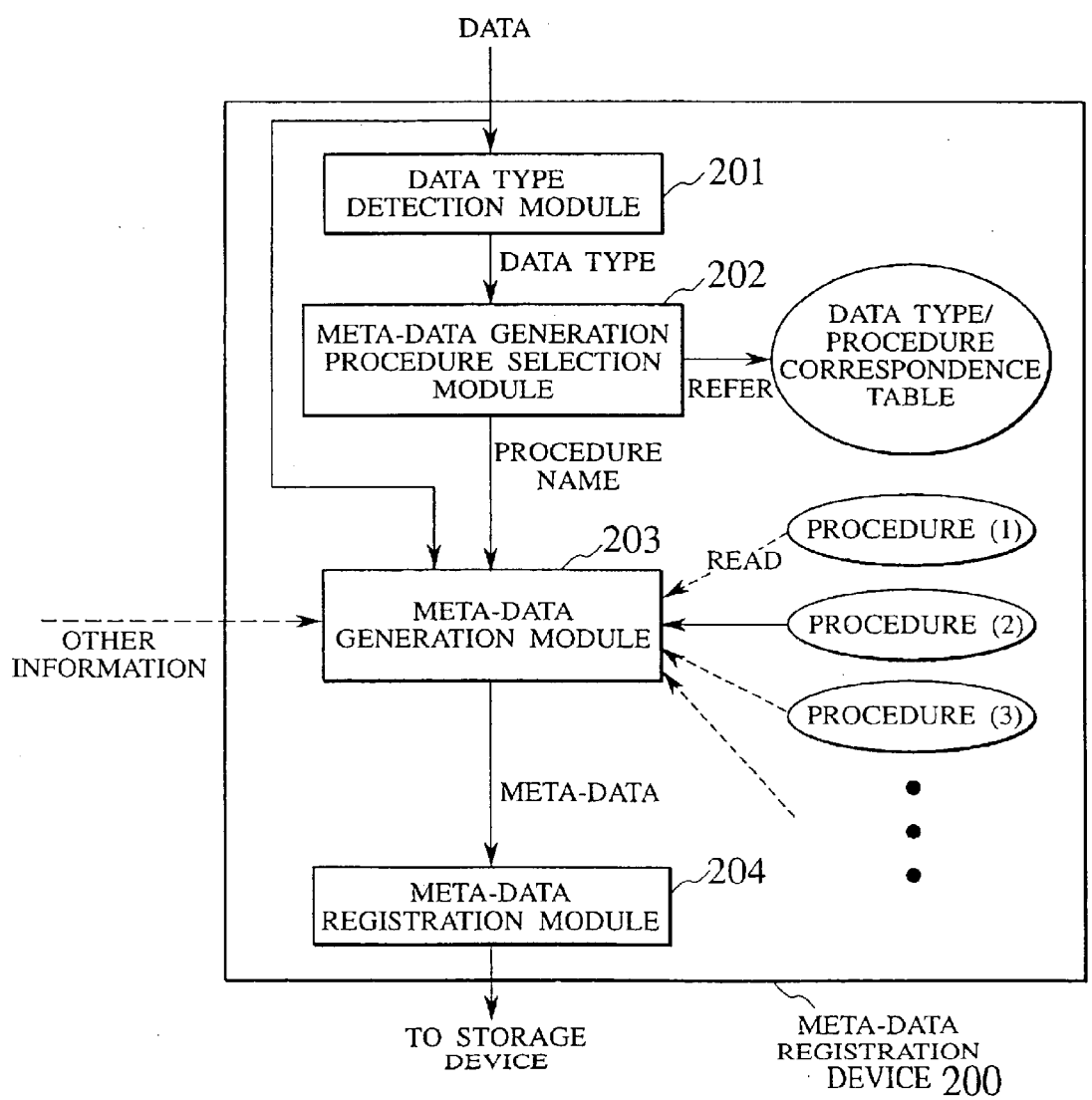
FIG. 5 is a block diagram showing an exemplary configuration of a meta-data registration device according to one embodiment of the present invention.
Figure 6:
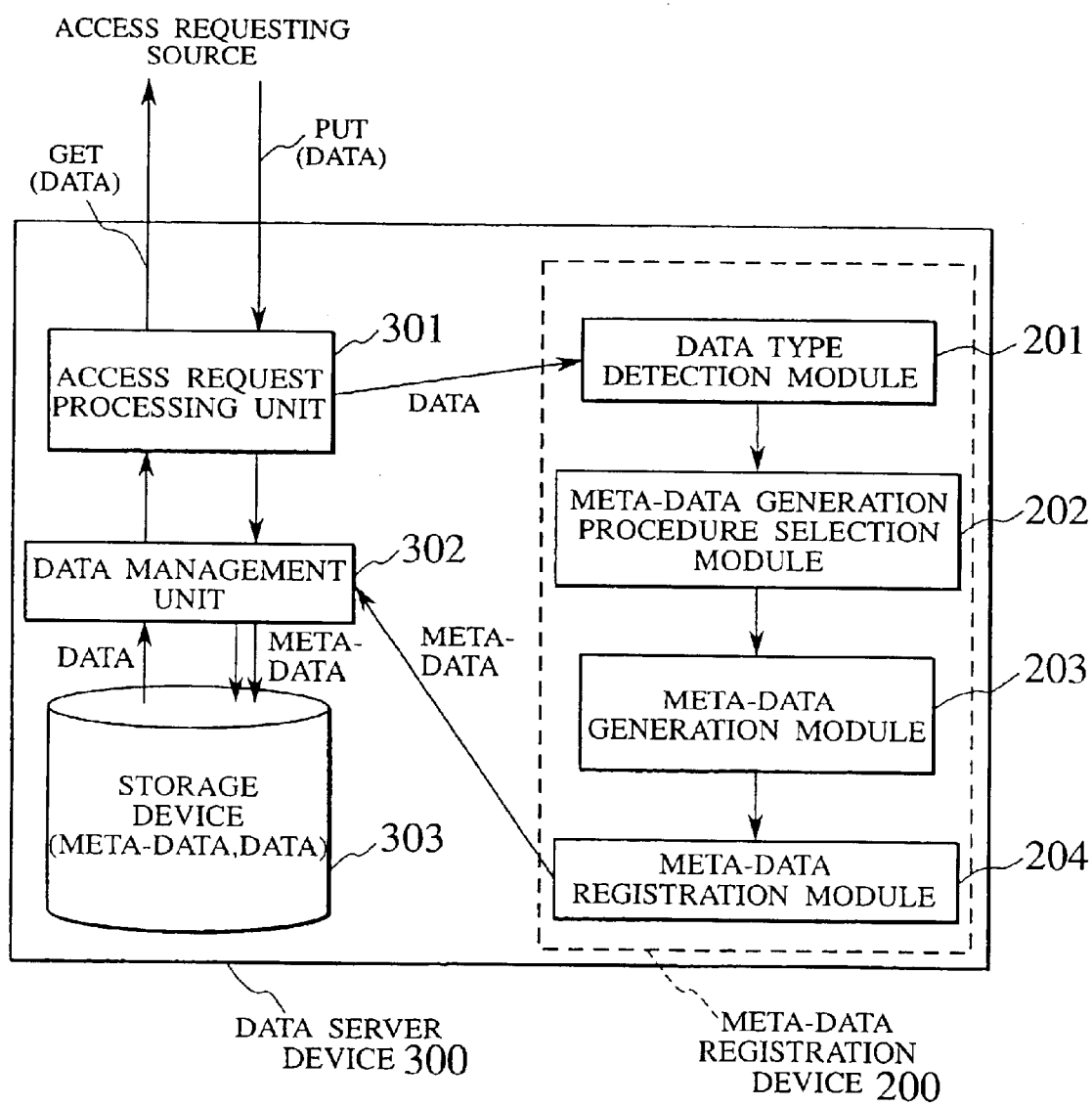
FIG. 6 is a block diagram showing an exemplary configuration of a data server device incorporating the meta-data registration device of FIG. 5.

FIG. 5 shows an exemplary configuration of a meta-data registration device 200 according to one embodiment of the present invention, and FIG. 6 shows an exemplary configuration of a data server device 300 which incorporates the meta-data registration device 200 of FIG. 5 in addition to the general configuration of a data server device shown in FIG. 4. Note that FIG. 6 shows the meta-data server 200 only in a schematic configuration for the sake of simplicity but it should be understood that the meta-data server 200 actually has a detailed configuration as shown in FIG. 5.

When a request for registering data (PUT, for example) arrives at the data server device 300, the access request processing unit 301 of the data server device 300 gives this data to the data management unit 302 which carries out a processing for registering this data into the storage device 303, while also giving this data to a data type detection module 201 of the meta-data registration device 200.

The data type detection module 201 checks a data type of the data received from the access request processing unit 301.

A meta-data generation procedure selection module 202 of the meta-data registration device 200 is managing a correspondence between various data types and meta-data generation procedures (programs) for data of respective data types, in a form of a table, for example. The meta-data generation procedure selection module 202 receives the data type detected by the data type detection module 201, refers to the above described correspondence table, and selects the meta-data generation procedure corresponding to that data type.

A meta-data generation module 203 of the meta-data registration device 200 reads a program corresponding to the meta-data generation procedure selected by the meta-data generation procedure selection module 202, and generates a meta-data corresponding to the data given from the access request processing unit 301 by using this program.

A meta-data registration module 204 of the meta-data registration device 200 registers the meta-data generated by the meta-data generation module 203 in relation to the corresponding data, by commanding the data management unit 302 accordingly.

Note that each unit or module described above can be realized in a form of hardware, software, or a combination of software and hardware. It is also possible to realize the data server device or the meta-data registration device of the present invention by installing a program for realizing functions of each unit or module described above into a general purpose computer.

Now, an exemplary case of applying the present invention to a Web server compatible with WebDAV will be described. In this example, the data type is detected from a MIME type or an extension of a data name of the data to be registered into the Web server.

The Web server of this example has a meta-data generation procedure table (data type/procedure correspondence table) as shown in FIG. 7. This meta-data generation procedure table is a table indicating a correspondence among three pieces of information including a MIME type, an extension of data corresponding to that MIME type, and a meta-data generation procedure corresponding to that MIME type. For example, this table indicates that data in the type of "image/jpeg" has the extension of either "jpeg" or "jpg", and its meta-data generation procedure is specified by "metajpeg". Here, the meta-data generation procedure name is actually given by either a pointer to a function or a name of a program module to be executed.

Instead of providing such a meta-data generation procedure table, it is also possible to embed these correspondences into a meta-data registration program (a program for causing the general purpose computer to virtually operate as a meta-data registration device having a configuration as shown in FIG. 5) as conditional branchings.

Figure 8:
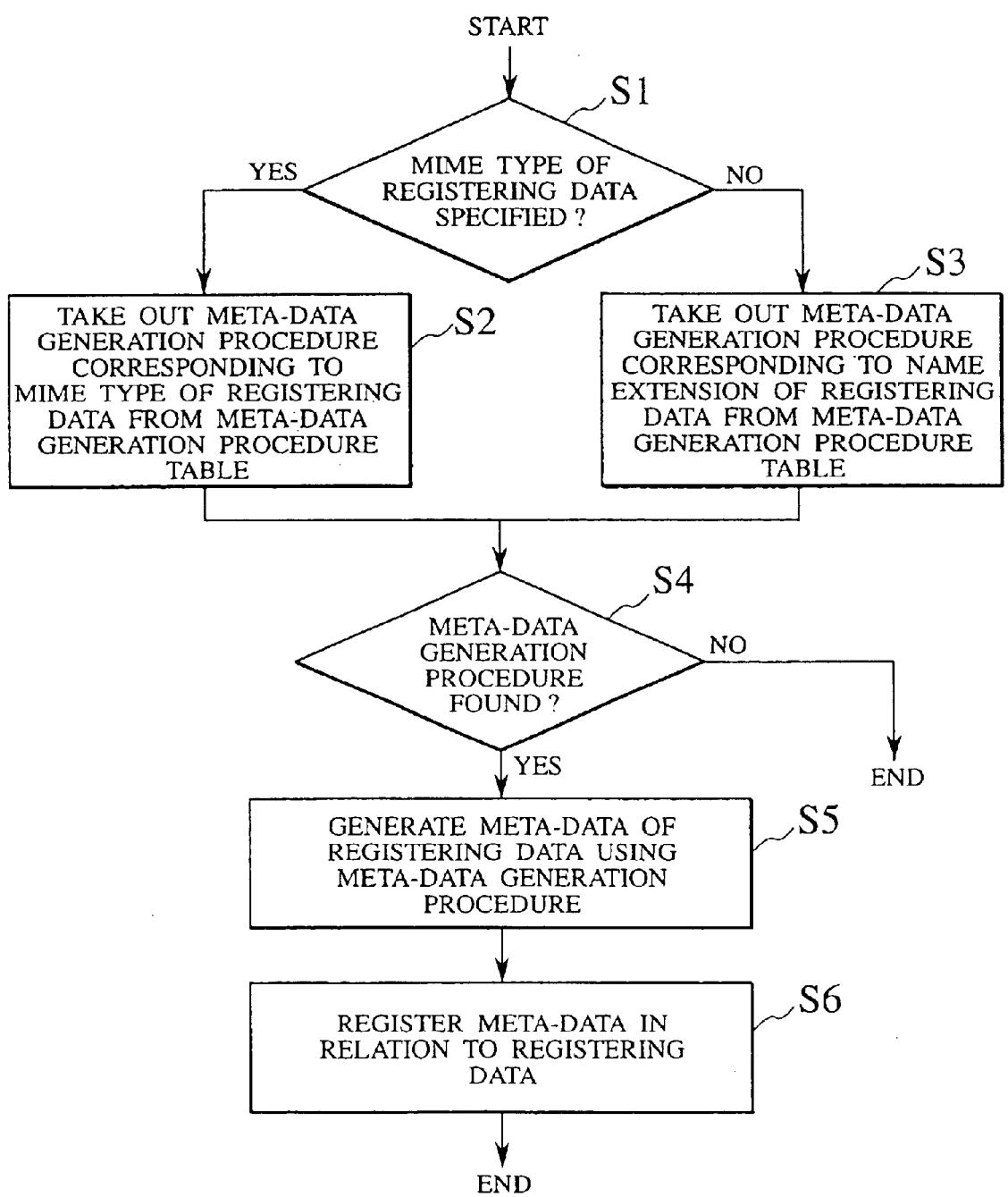
FIG. 8 is a flow chart for an exemplary meta-data registration processing by the meta-data registration device of FIG. 5.

When the Web server of this example receives a PUT request which is a data registration request, that data is registered under the specified name, while the meta-data registration processing as shown in FIG. 8 is started.

In the meta-data registration processing of FIG. 8, whether the MIME type of the data to be registered (registering data) is specified in the header of the PUT request or not is checked (step S1).

If the MIME type is specified, the meta-data generation procedure table is referred using a name of the specified MIME type as a key, and the meta-data generation procedure for the data in that MIME type is taken out (step S2). If the MIME type is not specified, an extension portion of a name of the registering data is taken out, the meta-data generation procedure table is referred using that extension as a key, and the meta-data generation procedure for the data having that extension is taken out (step S3). Here, when the MIME type of the registering data does not exist in the meta-data generation procedure table at the step S2, or when the extension of the registering data does not exist in the meta-data generation procedure table at the step S3, it indicates that the meta-data generation procedure for this data is not provided (step S4 N0), so that the processing is terminated without attaching any meta-data to the registering data. On the other hand, when the corresponding meta-data generation procedure is found (step S4 YES), this procedure is executed to generate the meta-data to be attached to the registering data (step S5).

The meta-data generated here is a collection of arbitrary numbers of pairs of meta-data name and value as shown in FIG. 9. In this example, the meta-data with a name "data" has a value "1998-07-12", the meta-data with a name "author" has a value "Y. Suzuki", and the meta-data with a name "program" has a value "photoshop4.0". After generating the meta-data in this manner, the meta-data is registered in relation to the registering data (step S6).

In this example, the processing is immediately terminated at the step S4 when the meta-data generation procedure corresponding to the data type of the registering data is not found, but this part of the processing may be modified as follows. Namely, it Is possible to generate a meta-data indicating that the meta-data generation procedure for that data was not found at the step S5, and register this meta-data in relation to the registering data at the step S6. Alternatively, it is also possible to notify the user who is registering the data that the meta-data generation procedure corresponding to the registering data cannot be found so that the automatic generation of meta-data is not carried out. By this notification, the user can recognize the fact that the registering data has no meta-data attached so that this registering data cannot be searched by the subsequent retrieval using the meta-data. This is also effective in warning the user when a wrong data is registered or a wrong data registration method is used.

The above described example employs both a method for detecting the data type according to the MIME type specified in the header of the PUT request and a method for detecting the data type according to an extension of a name of the registering data, with the higher priority given to the former method, but it is also possible to employ both methods with the higher priority given to the latter method, or either one of these methods alone may be employed. Also, after the step S5 executes the meta-data generation procedure selected according to the MIME type at the step S2 once, if it is found out that the meta-data generation was not carried out appropriately, it is possible to select another meta-data generation procedure according to the extension once again, and execute this procedure to generate new meta-data once again.

Also, as a method for detecting the data type, it is possible to employ a method which checks first several bytes of the data and judges the data type according to a value of the checked bytes, or a method which checks contents of data rather than the first several bytes and judges the data type according to the checked contents. For instance, in the case of data such as MPEG data, it is possible to judge that this data is MPEG data by checking whether the data contents include a data sequence in a particular pattern or not.

Also, in the above described example, the meta-data generation procedure corresponding to the data type of the registering data produces a list of meta-data to be attached in a predetermined format as shown in FIG. 9 first, and gives this list to the common processing step (step S6 of FIG. 8) which attaches the meta-data to the registering data, but it Is also possible to implement the present invention such that the meta-data is attached to the registering data directly by the meta-data generation procedure.

The meta-data generation procedures (programs) should be created for the respective data types in advance and provided in a computer (the data server device or the meta-data registration device). For example, a document data of an application such as word processor contains within itself information on a document creation date, a document title, a document creator name, etc., in a format suitable for that application. Consequently, the meta-data generation procedure can be created such that it extracts such an information contained in the document data itself as a meta-data in accordance with a format of the document data that is analyzed in advance. The similar meta-data generation procedure can be created also for a data format such as PDF that is widely used in distribution of electronic documents.

As disclosed in "Digital Still Camera Image File Format Standard (Exif) Version 2.1", JEIDA-49-1998, Japan Electronic Industry Development Association, data of a digital camera based on the widely used EXIF specification internally contains various information such as a model of camera used for image taking, date and time of image taking, a person who took the image, an image title, a shutter speed, an aperture, a lens focal length, latitude, longitude and altitude of an image taking location, user comments, etc. The EXIF specification based data has the MIME type of "image/jpeg" or "image/tiff", and the meta-data generation procedure corresponding to these data types is implemented such that it checks whether or not the EXIF information region is contained in a file of the JPEG or TIFF format, and extracts the EXIF information as the meta-data if the EXIF information region is contained. Even when the EXIF information region is not contained, it is still possible to extract some meta-data which is specific to the JPEG or TIFF format such as resolution.

As disclosed in "Recording—Helical-scan digital video cassette recording system using 6.35 mm magnetic tape for consumer use (525-60, 625-50, 1125-60 and 1250-50 systems)—" (IEC 61834), data of a digital video based on the widely used DV specification internally contains various information such as a recording date and time, a category indicating a recorded content, language, a channel in the case of recording a broadcast program, latitude and longitude of a recording location, various settings and device data of a camera, etc., within the video stream. The DV specification based data is often recorded as a file in the AVI format or the QuickTime format that are widely used on PCs, and has the MIME type of "video/x-msvideo" or "video/quicktime". The meta-data generation procedure corresponding to these data types is implemented such that it checks whether or not the DV data are contained in a file of the AVI or QuickTime format, and extracts the various DV data as the meta-data if the DV data are contained.

It is also possible for the meta-data generation procedure to acquire some information not contained in the registering data from the external and attach it as the meta-data, in addition to simply extracting information contained in the registering data as the meta-data, as indicated by a dashed line with arrowhead labelled "other information" that is entered into the meta-data generation module 203 in FIG. 5. For example, in the case of the DV specification based video data, it is possible to acquire information regarding the program from an electronic program guide (EPG) according to information on the recording time and the broadcast channel contained within the data, and register information on the program title, the cast, etc., that is contained in the acquired information as the meta-data. As for a method for extracting information from the electronic program guide, the electronic program guide information that is transmitted by utilizing a part of the broadcast signals can be stored in this data server device or a computer connected to this data server device, and information on the pertinent program can be extracted from there. Alternatively, it is also possible to extract the electronic program guide information on the pertinent program from another server that is registered in advance, via communication lines such as the Internet.

The types and the number of the meta-data to be generated by the meta-data generation procedure can be different for different data types. However, there are many meta-data which have the same meaning regardless of the data types, such as date, location, title, and data creator, for example. For these meta-data, it is preferable to create each meta-data generation procedure such that information extracted from data of different types will be registered as the meta-data of the same name. Namely, the meta-data generation procedure corresponding to the document data and the meta-data generation procedure corresponding to the JPEG data should preferably be created such that both the creation date extracted from the document data and the imaging date extracted from the EXIF information of the JPEG data will be registered under the meta-data name of "date".

By such an implementation, it becomes possible to carry out meaningful retrieval even when data of different types coexist. For example, when the digital camera data in the EXIF format, the digital video data in the DV format, and the schedule data, all of which were created on the same date, are coexisting, it is possible to select the schedule of that date and the camera images and the video taken on that date by the retrieval specifying that date. Besides that, it also becomes possible to carry out the retrieval for searching data regarding a certain location regardless of whether it is camera image or video.

In the case where the data type of the registering data is the XML document, it is also possible to change a manner of generating the meta-data according to a content of that XML document.

As shown in FIG. 10, the XML document has a tree structure with hierarchical tags called elements. Namely, what is enclosed between <book>and </book> is an element with an element name "book", and this element contains plural elements such as an element enclosed between <title> and </title>. To the XML document, it is possible to associate a document definition information called DTD. In the example of FIG. 10, the DTD with a name "book.dtd" is associated. In the DTD, what elements appears in what order or hierarchy in that document is defined. In the case of "book.dtd", it is defined that elements "title", "author", "publisher", etc., are arranged within a top level element "book". The XML document does not always have the DTD, and there can be XML documents without DTD. In such a case, there is a total freedom as to what elements are to be used in what order or hierarchy. As a method for defining the structure of the XML document, there are various available methods other than DTD, such as DDML, DCD, SOX, XML-DATA, and RDF, and any of these methods can be handled similarly in the meta-data registration device of this embodiment.

In the Web server of this example, when the data registration request using the PUT request is received, the meta-data generation procedure selection module 202 refers to the data type/procedure correspondence table and Judges that it is the XML document if the specified MIME type is "text/xml" or the extension is "xml". Then, the meta-data generation module 203 selectively executes the meta-data generation procedure corresponding to the data type of the XML document, where this meta-data generation procedure for the XML document refers to an XML meta-data correspondence table (not shown) to check whether there exists an element specified by the XML meta-data correspondence table in the registering XML document or not, and extracts information contained in that element if that element exists.

The XML meta-data correspondence table can be given by a table comprising three data items including a DTD name, an element name and a corresponding meta-data name, as shown in FIG. 11, for example. In the case of the XML document shown in FIG. 10, the DTD name is "book.dtd", and when the XML meta-data correspondence table of FIG. 11 is referred using this DTD name, it is indicated therein that information of the element under the name "title" should be set as a value of the meta-data under the name "title". information of the element under the name "author" should be set as a value of the meta-data under the name "author", and information of the element under the name "keywords" should be set as a value of the meta-data under the name "keyword". As a result, the meta-data as shown in FIG. 12 can be generated.

The types and/or the number of meta-data generated by the meta-data generation procedure for the XML document can be different for different XML documents to be registered. However, for the meta-data which have the same meaning but different element names in different XML documents, such as date, location, title, and data creator, for example, it is preferable to create the XML meta-data correspondence table such that information extracted from elements with different element names will be registered as the meta-data of the same name. Namely, the example of FIG. 11 is made such that both the "creator" information extracted from "photo.dtd" and the "author" information extracted from "book.dtd" will be registered under the meta-data name of "author". By this implementation, it is possible to carry out the meaningful retrieval even When XML documents with different DTDs are coexisting.

In the above described example, the information to be extracted as the meta-data is specified by the DTD name and the element name in the XML meta-data correspondence table, but it is also possible to specify the information to be extracted as the meta-data by the element name alone. In such a case, whenever the element with the specified name exists, the corresponding meta-data is extracted regardless of what XML document it is. This applies similarly for those XML documents without DTD.

It is also possible to specify an element from which the information should be extracted as the meta-data by a pair of a name space name and an element name. Here, the name space name is assigned in order to distinguish cases in which the same element name has different meanings depending on the DTDs in which it is defined.

In addition, instead of registering the information of the element specified in the XML meta-data correspondence table directly as a value of the meta-data, it is also possible to register the meta-data after removing unnecessary tags (such as tags of other elements that are contained in the specified element) from that information, summarizing the content of that information, or converting date or the like into some standard format, There are also cases where "application/xml" is used as the MIME type of the XML document, but these cases can be handled similarly as described above.

The other structured documents such as HTML documents and SGML documents can also be handled similarly as the XML documents.

A timing for generating and registering the meta-data using the meta-data registration device of this embodiment can be a timing for receiving and processing the data registration request at the data server device such as Web server, database server or file server, or the meta-data of the newly registered data can be generated and registered asynchronously after the data registration.

The meta-data registration device of this embodiment is equally applicable to a file system capable of managing the meta-data. In the case of the Web server, all the data will be registered collectively in response to the PUT request, but in the case of the file system, it is preferable to handle cases where a part of the already existing data is to be updated. For this reason, it is preferable to carry out the meta-data generation and registration processing similar to that in the case of the Web server, at a time of closing files. It is also possible to record which file is updated at a time of closing files, and carry out the meta-data generation and registration processing asynchronously later on by searching out the updated files.

In the meta-data registration device of this embodiment, a suitable meta-data generation procedure is selected according to the data type of the registering data. As a method for judging the data type, apart from those already described above, it is also possible to employ a method which handles data entered from a specific input device as a prescribed type. For example, it is possible to assume that video data entered from the digital video device via the IEEE 1394 network are always in the DV format, and carry out the procedure for extracting the meta-data from data of the DV format type with respect to such video data.

In the case of a system which can attach the meta-data not only to data but also to a directory, it is preferable to provide a function for updating the meta-data of a directory into which the data is to be registered, at a time of the data registration, in addition to the generation of the meta-data for that data. Namely, data or child directories contained in that directory may be changed by the new registration or deletion of data. For this reason, in addition to attaching the meta-data at a time of registration as in the case of the ordinary data, the need to change the meta-data of the directory is checked whenever data or child directory contained in the directory is added/deleted, and the meta-data of the directory is updated whenever necessary.

The information to be updated as the meta-data of that directory at a time of addition/deletion of data or child directory within that directory includes a range of dates of data and meta-data, a range of locations of data and meta-data, and keywords for retrieval of data and meta-data. Namely, the meta-data of the directory contains information indicating common features of the meta-data of data or child directories within that directory.

The meta-data generation procedure required in attaching the meta-data to the directory is different from the meta-data generation procedure for each data type in that it has to be managed in correspondence to the directory. As a method for maintaining this correspondence, there is a method which manages a pair of the directory name and the meta-data generation procedure for that directory in a correspondence table. As another method, there is also a method in which information on the meta-data generation procedure for that directory is included as a data under a specific name that is contained within that directory. As still another method, there is also a method in which a value of the meta-data with a specific name of that directory indicates information on the meta-data generation procedure of that directory or information for obtaining the meta-data generation procedure of that directory. Any of these methods may be used singly or in combination. it is also possible to check whether each method among a plurality of methods is applicable or not in a prescribed order, and use a method that is checked to be applicable first.

An exemplary operation in the case of employing the first method for maintaining the correspondence described above is as follows. When the addition/deletion of data or child directory occurs, the access request processing unit 301 or the data management unit 302 notifies this fact to the meta-data generation procedure selection module 202. Then, the meta-data generation procedure selection module 202 selects the meta-data generation procedure (program) corresponding to the directory that contains the data or child directory to be added/deleted, by referring to a directory name/procedure correspondence table (not shown). The meta-data generation module 203 then reads and executes the selected procedure. For example, the meta-data of that directory is read out from the storage device 303 through the data management unit 302 and its content is checked, while the meta-data of the data or child directories contained in that directory (at least one of the data or child directory to be added/deleted and the others) are read out and their contents are checked, and in the case where the common features of the meta-data of the data or child directories contained in that directory will be changed by that addition/deletion, new meta-data for that directory is generated. Then, the meta-data registration module 204 rewrites the meta-data of that directory into the newly generated content.

Besides that, it is also possible to change a manner of generating the meta-data at a time of generating the meta-data of data to be registered by the meta-data generation procedure, by referring to the meta-data of the directory into which this data is to be registered, as indicated by a dashed line with arrowhead labelled "other information" that is entered into the meta-data generation module 203 in FIG. 5.

For example, whether the directory has the meta-data of the same name as the meta-data generated from the registering data or not is checked. If it has, a value of the meta-data of the registering data and a value of the meta-data of the directory are compared, and if they differ (they do not coincide or a value of the meta-data of the registering data is not within a range of a value of the meta-data of the directory), this fact is-notified to the data registration requesting source. By this implementation, it is possible to prevent the erroneous registration of data with different dates into a directory in which only data of the same date should be entered, for example.

As another example, whether the directory has the meta-data of the same name as the meta-data generated from the registering data or not is checked. If it has, a value of the meta-data of the registering data and a value of the meta-data of the directory are compared, and if they coincide, this meta-data is not generated for the registering data. In this way, when-there is some data which does not have the meta-data of interest, a value of the meta-data with the same name of the directory in which that data exists can be used as a default value (or when data having a certain meta-data value is to be searched but there is some data which does not have that meta-data, the search can be carried out by regarding a value of that meta-data of the directory in which that data exists as a value of that meta-data of that data). As a result, in the case of the directory into which a plurality of data with the same date are contained, for example, the meta-data for the date Is attached only to the directory and not to individual data, so that it is possible to save the storage capacity. Also, in this method, when most of the data in the directory use the default date as the meta-data, it Is still possible to allow the entry of data having an exceptional value for the meta-data for the date into that directory (in which case, at a time of the search, the default date is used for those data which have no meta-data for the date and the date indicated by the meta-data for the date is used for those data which have the meta-data for the date).

Also, as other embodiments of the present invention, it is possible to Implement a part of the functions of the meta-data registration device separately, in the external of the data server, rather than incorporating the entire meta-data registration device as a part of the data server device such as Web server or file system.

Figure 13:
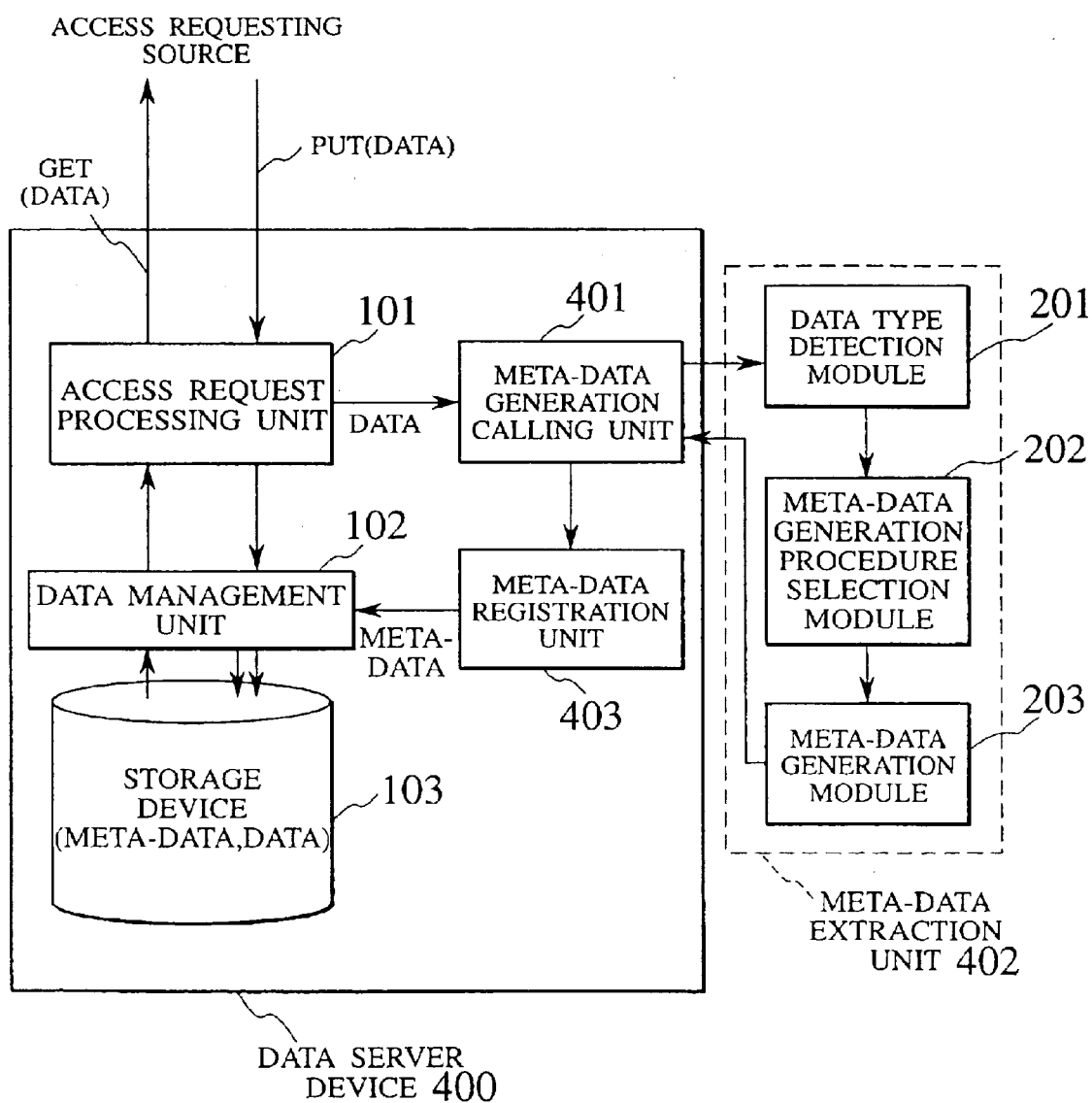
FIG. 13 is a block diagram showing another exemplary configuration of a data server device incorporating a meta-data registration device according to one embodiment of the present invention.

FIG. 13 shows a configuration in which all the functions related to the meta-data generation among the functions of the meta-data registration device are implemented separately in the external of the data server device. In this configuration, a function (201) for detecting the data type of the registering data, a function (202) for selecting the meta-data generation procedure corresponding to that data type, a function (203) for generating the meta-data using the selected procedure, and a function for returning the obtained result to the data server device 400 in a format shown in FIG. 9, for example, are provided in a meta-data extraction unit 402 which is independent from the data server device 400. A meta-data generation calling unit 401 provided in the data server device 400 gives the data to the meta-data extraction unit 402 and receives the meta-data generated as a result, and a meta-data registration unit 403 provided in the data server device 400 registers the received meta-data into the storage device 103 through the data management unit 102. Communications between the data server device 400 and the meta-data extraction unit 402 are realized by inter-process communications or communications via network.

Figure 14:
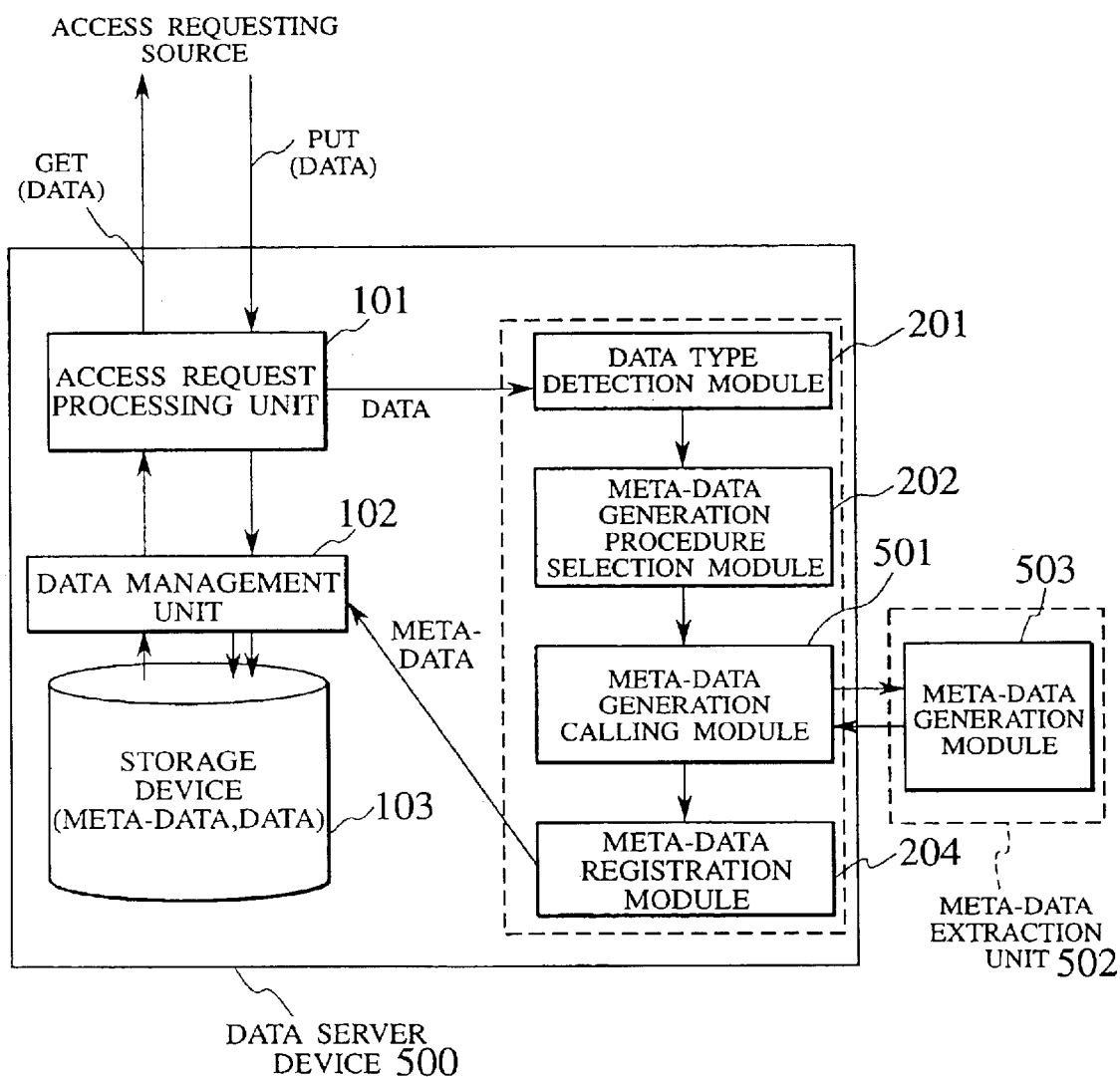
FIG. 14 is a block diagram showing still another exemplary configuration of a data server device incorporating a meta-data registration device according to one embodiment of the present invention.

FIG. 14 shows a configuration in which the function related to the meta-data generation with respect to a specific data type among the functions of the meta-data registration device are implemented separately in the external of the data server device. In this configuration, a function (503) for generating the meta-data for the data in the specific data type given from the data server device 500 and returning the obtained result to the data server 500 in a format shown in FIG. 9, for example, is provided in a meta-data extraction unit 502 which is independent from the data server device 500. A meta-data generation calling module 501 provided in the data server device 500 gives the data to the meta-data extraction unit 502 when the generation procedure selected by the meta-data generation procedure selection module 202 should be executed outside the data server device 500, and receives the meta-data generated as a result. There may be a plurality of meta-data extraction units 502 in correspondence to a plurality of data types. In such a case; the meta-data generation calling-module 501 gives the data to one meta-data extraction unit 502 that has the procedure specified from the meta-data generation procedure selection module 202 among a plurality of meta-data extraction units 502.

In the case of adopting a configuration as shown in FIG. 14, information necessary in calling the external function for extracting the meta-data for the data type is recorded in an entry of the meta-data generation procedure for that data type in the meta-data generation procedure table to be referred by the meta-data generation procedure selection module 202. For example, in the case where the data server device 500 and the meta-data extraction unit 502 communicate using SOCKET which is the inter-process communication function of the UNIX, an address of SOCKET is recorded. It is also possible to use both the configuration of FIG. 14 and the configuration of FIG. 6 in combination.

As described, according to the present invention, it is possible to attach the meta-data to the registering data automatically, so that it is possible to relieve the user from the tedious task of attaching the meta-data to each individual registering data, and the necessary meta-data can be attached without failure.

In addition, the meta-data under the same names can always be attached to data of the same data type, and even for data of the different data types, the same name can be used for the meta-data which have the same meaning at a level of the meta-data generation procedure, so that it is possible to carry out the retrieval specifying the same meta-data name with respect to a wide range of data.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the meta-data registration device of the data server device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMS, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A meta-data registration method, comprising the steps of:
   detecting at least one of a MIME format and a data name extension of registering data to be registered into a Web server that registers and manages data and meta-data for data;
   selecting one procedure corresponding to the MIME format or the extension detected by the detecting step, from a plurality of procedures each provided in correspondence to at least one of a MIM format and an extension and stored in advance, each procedure having a program code for generating the meta-data for data according to a corresponding MIME format or extension, each procedure containing information for specifying formats of the meta-data to be generated according to the corresponding MIME format or extension, and each procedure being designed to generate names and values of the meta-data in formats specified by said information;
   generating the meta-data for the registering data by executing the program code of said one procedure selected by the selecting step; and
   registering the meta-data generated by the generating step in relation to the registering data into the Web server.

2. The method of claim 1, wherein the plurality of procedures are designed such that those meta-data that are generated by different procedures but that have an identical meaning to an application or a user will be given an identical name.

3. The method of claim 1, wherein a value of the meta-data is generated by extracting at least one of information contained in the registering data and separately stored information that is acquired according to the information contained in the registering data.

4. The method of claim 1, wherein the detecting step detects the data format by checking information contained in a header of a registration request for the registering data issued to the Web server.

5. The method of claim 1, further comprising the steps of:
   carrying out at least one of a processing for generating one meta-data indicating non-existence of a corresponding procedure and registering said one metalata in relation to the registering data, and a processing for notifying the non-existence of the corresponding procedure to an application or a user, when the corresponding procedure of the MIME format or extension detected by the detecting step does not exist among the plurality of procedures stored in advance.

6. The method of claim 1, wherein the plurality of procedures includes a first procedure corresponding to structured documents, which contains a structure information indicating a structure as a format of the meta-data to be generated, extracts a portion specified by the structure information from a document represented by the registering data, and generates the meta-data given by an extracted portion in correspondence to a name specified by the first procedure.

7. The method of claim 6, wherein the first procedure defines the structure information for each definition information that defines a document structure, and is designed such that those meta-data that are generated from different documents using different definition information but that have an identical meaning to an application or a user will be given an identical name.

8. The method of claim 1, wherein the Web server manages data using directories, and the method further comprises the steps of:
   additionally selecting another procedure corresponding to one directory for containing data to be added or deleted, from another plurality of procedures provided in correspondence to respective directories and stored in advance, each of the another plurality of procedures having another program code for generating directory meta-data that can be utilized in managing a corresponding directory, when a new data is to be added to or an existing data is to be deleted from the Web server:
   additionally generating new directory meta-data by executing the another program code of the another procedure selected by the additionally selecting step; and
   updating the directory meta-data already registered in relation to said one directory to the new directory meta-data generated by the additionally generating step.

9. The method of claim 1, wherein the Web server manages data using directories, and the method further comprises the steps of:
   notifying an application or a user that issued a registration request for the registering data to the Web server when the meta-data generated for the registering data does not match with the directory meta-data that is used in managing one directory for containing the registering data.

10. The method of claim 1, wherein the Web server manages data using directories, and the method further comprises the steps of:
   registering the meta-data generated for the registering data in relation to the registering data when the meta-data generated for the registering data does not match with directory meta-data that is used in managing one directory for containing the registering data, and not registering the meta-data generated for the registering data otherwise.

11. The method of claim 10, it wherein further comprising the step of:

managing the registering data at the Web server by using the meta-data registered in relation to the registering data when the meta-data registered in relation to the registering data exists, or by using the meta-data for said one directory otherwise.

12. A meta-data registration device, comprising:

a detection unit configured to detect at least one of a format and a data name extension of registering data to be registered into a Web server that registers and manages data and meta-data for data;

a selection unit configured to select one procedure corresponding to the MIME format or the extension detected by the detection unit, from a plurality of procedures each provided in correspondence to at least one of a MIME format and an extension and stored in advance, each procedure having a-program code for generating the meta-data for data according to a corresponding MIME format or extension, each procedure containing information for specifying formats of the meta-data to be generated according to the corresponding MIME format or extension, and each procedure being designed to generate names and values of the meta-data in formats specified by said information; and an output unit configured to output the meta-data for the registering data generated by executing the program code of said one procedure selected by the selection unit, to the Web server.

13. The meta-data registration device of claim 12, further comprising:

a generation unit configured to generate the meta-data for the registering data by executing the program code of said one procedure selected by the selection unit, wherein the output unit registers the meta-data generated by the generation unit in relation to the registering data into the Web server.

14. The meta-data registration device of claim 12, further comprising:

an acquisition unit configured to acquire the meta-data for the registering data generated by executing the program code of said one procedure selected by the selection unit, wherein the output unit registers the meta-data for the registering data acquired by the acquisition unit in relation to the registering data into the Web server.

15. A Web server device, comprising:

a request processing unit configured to receive and process a registration request for registering data to be registered into the Web server device;

a management unit configured to register the registering data according to the registration request and manage data and meta-data for data;

a detection unit configured to detect at least one of a MIME format and a data name extension of the registering data;

a selection unit configured to select one procedure corresponding to the MIME format or the extension detected by the detection unit, from a plurality of procedures each provided in correspondence to at least one of a MIME format and an extension and stored in advance, each procedure having a program code for generating the meta-data for data according to a corresponding MIME format or extension, each procedure containing information for specifying formats of the meta-data to be generated according to the corresponding MIME format or extension, and each procedure being designed to generate names and values of the meta-data in formats specified by said information;

a generation unit configured to generate the meta-data for the registering data by executing the program code of said one procedure selected by the selection unit; and a registration unit configured to register the meta-data generated by the generation unit into the management unit.

16. A computer usable medium having computer readable program code embodied therein for causing a computer to function as a meta-data registration device, the computer readable program codes include:

a first computer readable program code for causing said computer to detect at least one of a MIME format and a data name extension of registering data to be registered into a Web server that registers and manages data and meta-data for data;

a second computer readable program code for causing said computer to select one procedure corresponding to the MIME format or the extension detected by the first computer readable program code, from a plurality of procedures each provided in correspondence to at least one of a MIME format and an extension and stored in advance, each procedure having a program code for generating the meta-data for data according to a corresponding MIME format or extension, each procedure containing information for specifying formats of the meta-data to be generated according to the corresponding MIME format or extension, and each procedure being designed to generate names and values of the meta-data in formats specified by said information; and a third computer readable program code for causing said computer to output the meta-data for the registering data generated by executing the program code of said one procedure selected by the second computer readable program code, to the Web server.

17. The computer usable medium of claim 16, wherein the computer readable program codes further include:

a fourth computer readable program code for causing said computer to generate the meta-data for the registering data by executing the program code of said one procedure selected by the second computer readable program code, wherein the third computer readable program code registers the meta-data generated by the fourth computer readable program code in relation to the registering data into the Web server.

18. The computer usable medium of claim 16, wherein the computer readable program codes further include:

a fourth computer readable program code for causing said computer to acquire the meta-data for the registering data generated by executing the program code at said one procedure selected by the selection unit, wherein the third computer readable program code registers the meta-data for the registering data acquired by the fourth computer readable program code in relation to the registering data into the Web server.

19. A computer usable medium having computer readable program codes embodied therein for causing a computer to function as a Web server device, the computer readable program codes include:

a first computer readable program code for causing said computer to receive and process a registration request for registering data to be registered into the Web server device;

a second computer readable program code for causing said computer to register the registering data according to the registration request and manage data and meta-data for data;

a third computer readable program code for causing said computer to detect at least one of a MIME format and a data name extension of the registering data;

a fourth computer readable program code for causing said computer to select one procedure corresponding to the MIME format or the extension detected by the third computer readable program code, from a plurality of procedures each provided in correspondence to at least one of a MIME format and an extension and stored in advance, each procedure having a program code for generating the meta-data for data according to a corresponding MIME format or extension each procedure containing information for specifying formats of the meta-data to be generated according to the corresponding MIME format or extension, and each procedure being designed to generate names and values of the meta-data in formats specified by said information;

a fifth computer readable program code for causing said computer to generate the meta data for the registering data by executing the program code of said one procedure selected by the fourth computer readable program code; and a sixth computer readable program code for causing said computer to register the meta-data generated by the fifth computer readable program code into a management unit in the Web server.

20. A meta-data registration method, comprising the steps of:

detecting at least one of a MIME format and a data name extension of registering data to be registered into a Web server that registers and manages data and meta-data for data on a name space having tree-like hierarchical structure;

selecting one procedure corresponding to the MIME format or the extension detected by the detecting step, from a plurality of procedures each provided in correspondence to at least one of a MIME format and an extension and stored in advance, each procedure having a program code for generating the meta-data for data according to a corresponding MIME format or extension, each procedure containing information for specifying formats of the meta-data to be generated according to the corresponding MIME format or extension, and each procedure being designed to generate names and values of the meta-data in formats specified by said information;

generating the meta-data for the registering data by executing the program code of said one procedure selected by the selecting step; and registering the meta-data generated by the generating step in relation to the registering data into the Web server.

* * * * *